March 19, 1968  L. J. BISHOP  3,373,698
SIGNAL SETTING MECHANISM FOR TOW TRUCK CONVEYOR SYSTEMS
Filed April 5, 1966  2 Sheets-Sheet 1
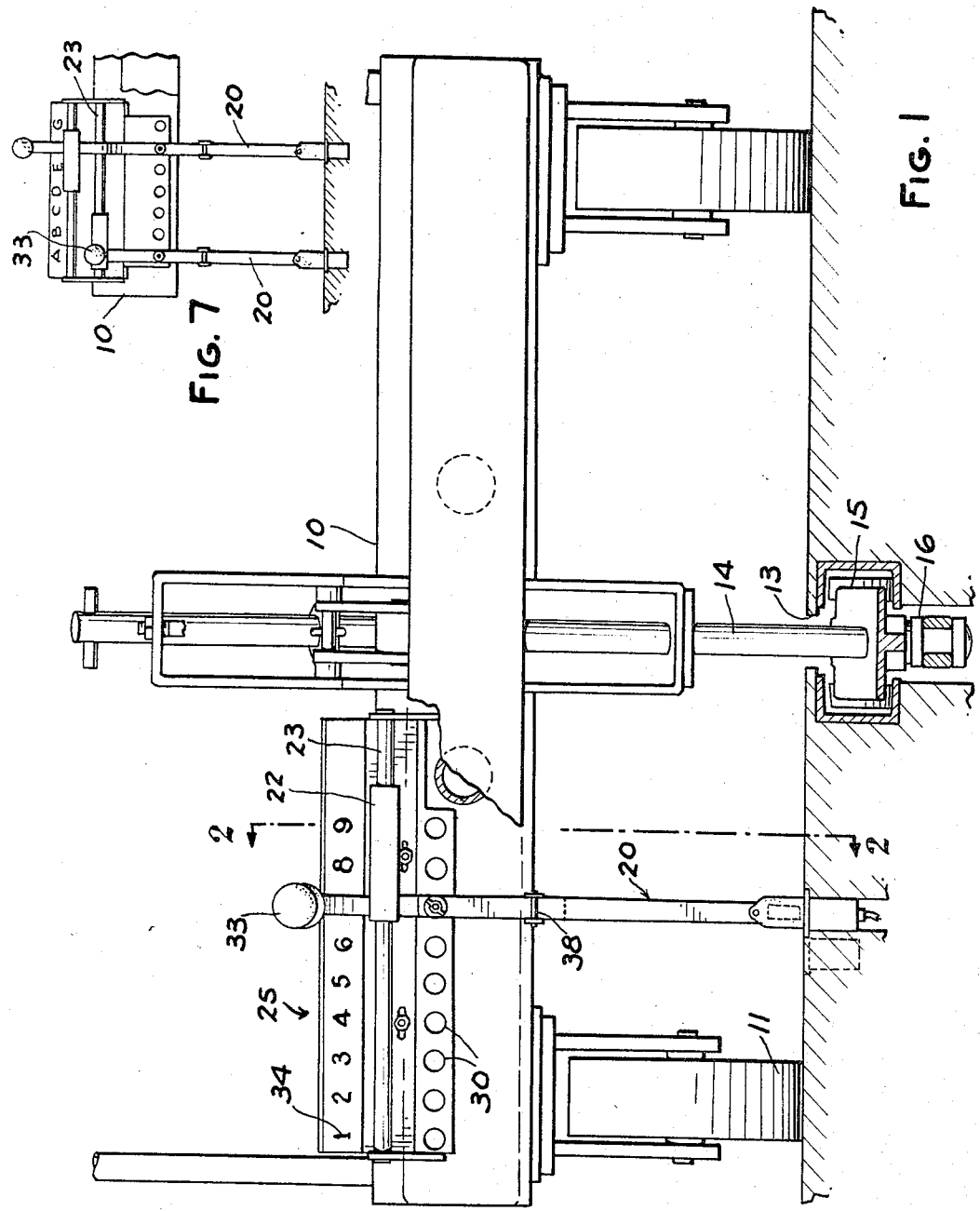
INVENTOR.
LEONARD J. BISHOP
BY
Barnes, Kisselle, Raisch & Choate
ATTORNEYS

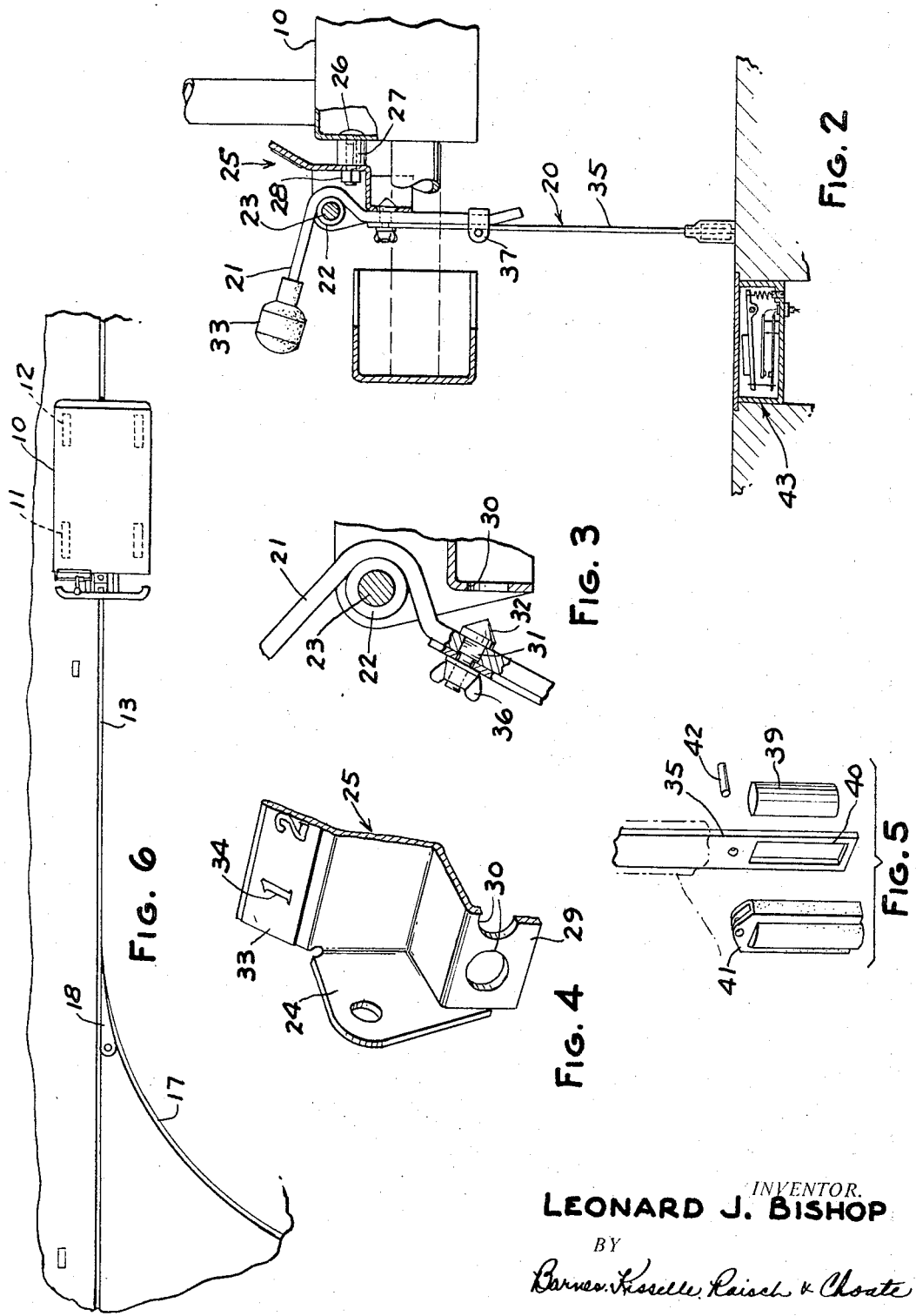

United States Patent Office 3,373,698
Patented Mar. 19, 1968

3,373,698
SIGNAL SETTING MECHANISM FOR TOW
TRUCK CONVEYOR SYSTEMS
Leonard J. Bishop, Birmingham, Mich., assignor to
Mechanical Handling Systems, Inc., Warren, Mich.,
a corporation of Michigan
Filed Apr. 5, 1966, Ser. No. 540,285
15 Claims. (Cl. 104—88)

This invention relates to tow truck conveyor systems and particularly to a signal setting mechanism for such systems.

In tow truck conveyor systems wherein a plurality of tow trucks are moved along a track with a tow pin on each truck extending downwardly through a slot into engagement with lugs on a conveyor chain, it is conventional to provide a signal system for stopping or diverting the tow trucks. Such a system is shown, for example, in the patents to Klamp et al. 2,965,043, issued Dec. 20, 1960, and Klamp, 3,024,741, issued Mar. 13, 1962.

Among the objects of the present invention are to provide a signal setting mechanism for tow truck conveyor systems which is simple, quick to operate, will function with minimum of friction, and which is low in cost.

In the drawings:

FIG. 1 is a fragmentary front elevational view of a tow truck embodying the invention.

FIG. 2 is a fragmentary sectional view taken along the line 2—2 in FIG. 1.

FIG. 3 is a fragmentary view on an enlarged scale of a portion of the tow truck shown in FIG. 2, showing the parts in a different operative position.

FIG. 4 is a fragmentary perspective view of a portion of the tow truck embodying the invention.

FIG. 5 is a fragmentary exploded view of a portion of the signal setting mechanism.

FIG. 6 is a fragmentary diagrammatic view of a tow truck conveyor system embodying the invention.

FIG. 7 is a fragmentary front elevational view of a modified form of the invention.

Referring to FIG. 6, the invention relates to a tow truck conveyor system wherein a plurality of tow trucks 10 having wheels 11, 12 thereon are moved along a track defined by a slot 13 by engagement of a tow pin 14 on each truck with a lug 15 of a chain 16 beneath the slot 13. In such a system, it is conventional to provide a signal mechanism for stopping the tow truck at desired positions or for diverting the tow truck to branch slots 17. Such signal systems may comprise either electrical or mechanical controls that generally either lift the tow pin or actuate a switch 18 to divert the tow pin to the branch slot 17.

The present invention is hereafter described in connection with an electrical signal system to which it is particularly adapted but, as will be apparent to a person skilled in the art, the signal setting mechanism may also be used in connection with mechanical systems.

As shown in FIGS. 1 and 2, a probe 20 is mounted on the front end of the truck 10 and can be moved to one of a plurality of positions transversely of the truck. Specifically, the probe 20 includes a generally L-shaped member 21 that is fixed to a sleeve 22 which, in turn, is telescoped over a rod 23. The rod 23 extends transversely between the flanges 24 of a bracket 25 that is mounted on the front end of the truck 10 by bolts 26, spacers 27 and nuts 28. The bracket 25 includes a downwardly extending flange 29 that has a plurality of transversely spaced circular openings 30 therein. A bolt 31 is mounted on the probe member 21 at a point spaced vertically below the rod 23 on which the sleeve 22 is telescoped and has a projection 32 thereon that is adapted to selectively engage one of the openings 30 in bracket 25. The upper end of the probe member 21 extends forwardly and is provided with a knob 33 to form a handle whereby the probe can be swung upwardly and forwardly to disengage the projection 32. The weight of the knob 33 counterbalances the weight of the probe 20 and urges the projection 32 into one of the openings 30. The end of the projection 32 is tapered in the form of cone to facilitate the insertion of the projection 32 into an opening 30 so that the probe 20 is properly positioned. A tape 33 bearing numerals 34 corresponding to the transverse positions of the probe is mounted on flange 28 to facilitate the positioning of the probe 20 by the operator.

In the form of the invention that is shown, the probe assembly 20 includes a flexible strap 35 that is connected to the probe element 21 by being clamped by a wing nut 36 onto the bolt 31. Strap 35 extends downwardly through a guide formed by flanges 37 and a cross pin 38. A magnet 39 is mounted in an opening 40 in the lower end of the strap 35 by a plastic closed end sleeve 41 that is heat-shrunk over the magnet 39 and strap 35 after the magnet 39 has been inserted into the opening 40. A plastic pin 42 extends through the sleeve 41 and strap 35 and insures that the magnet will not be inadvertently removed. In this manner, the magnet is supported in close proximity with the upper surface of the floor. If the magnet is properly positioned transversely of the truck, it will cause a switch mechanism 43 mounted in the floor at transversely spaced positions to be actuated and thereby produce an appropriate signal. It should be understood that switch mechanisms 43 are provided at various transverse positions and if the probe 20 is appropriately positioned, it will cause the switch to be actuated. The switch mechanism 43 may consist of any appropriate mechanism that will be actuated by the magnet 39.

In the form of the invention shown in FIG. 7, a pair of probes 20 are mounted on the single rod 23 to provide a greater selection of switch settings. It can be appreciated that a bracket 25 can be provided on each side of the tow pin 14 in order that an even greater number of switch selections may be made.

It can thus be seen that there has been provided a signal setting mechanism which is simple, can be quickly adjusted and is low in cost.

I claim:

1. For use in a tow truck conveyor system wherein a plurality of trucks are adapted to be moved along a track by engagement of means on the truck with a conveyor chain beneath the floor, a signal setting mechanism comprising a probe,
means for mounting the probe in the front of the tow truck for movement transversely of the truck and for pivotal movement about an axis extending transversely of the truck,
and locating means for locating said probe transversely of the truck comprising a projection on one of said probe and said truck and an opening on the other of said probe and said truck,
said projection adapted to engage said opening,
said projection and said opening being spaced from the pivotal axis of said probe.

2. The combination set forth in claim 1 including a handle on said probe.

3. The combination set forth in claim 1 wherein said projection is tapered to facilitate engagement of the projection with said opening.

4. The combination set forth in claim 3 wherein said opening is circular.

5. The combination set forth in claim 1 wherein said projection is mounted on said probe and said opening is on said truck.

6. The combination set forth in claim 1 wherein said means for mounting said probe comprises a rod extending transversely of said truck, said probe having a sleeve thereon telescoped over said rod.

7. The combination set forth in claim 1 wherein said probe includes a flexible strap extending downwardly.

8. The combination set forth in claim 7 including a magnet mounted on the lower end of said flexible strap.

9. The combination set forth in claim 8 including a sleeve made of non-magnetic material mounted on said strap and supporting said magnet.

10. The combination set forth in claim 9 wherein said sleeve is made of heat-shrinkable plastic which is shrunk over said magnet.

11. For use in a tow truck conveyor system wherein a plurality of trucks are adapted to be moved along a track by engagement of means on the truck with a conveyor chain beneath the floor, a signal setting mechanism comprising a probe, means for mounting the probe on the front of the tow truck for movement transversely of the truck and for pivotal movement about an axis extending transversely of the truck, and locating means for locating said probe transversely of the truck comprising a projection on said probe and a plurality of openings on said truck, said projection adapted to selectively engage one of said openings and prevent lateral movement of the probe, said projection and said opening being spaced from the pivotal axis of said probe.

12. The combination set forth in claim 11 including a handle on said probe.

13. The combination set forth in claim 11 wherein said projection is tapered to facilitate engagement of the projection with said opening.

14. The combination set forth in claim 13 wherein said opening is circular.

15. The combination set forth in claim 13 wherein said means for mounting said probe comprises a rod extending transversely of said truck, said probe having a sleeve thereon telescoped over said rod.

References Cited

UNITED STATES PATENTS 2,816,516  12/1957  Diehl _____ 104—88

JOSEPH R. LECLAIR, *Primary Examiner.*

ARTHUR L. LA POINT, *Examiner.*

D. F. WORTH, *Assistant Examiner.*